United States Patent [19]
Pretorius et al.

[11] 4,169,790
[45] Oct. 2, 1979

[54] SOLID SURFACE TEXTURE SUITABLE FOR A STATIONARY PHASE FOR CHROMATOGRAPHY

[75] Inventors: Victor Pretorius; Jacobus D. Schieke, both of Pretoria, South Africa

[73] Assignee: South African Inventions Development Corporation, Pretoria, South Africa

[21] Appl. No.: 875,028

[22] Filed: Feb. 3, 1978

Related U.S. Application Data

[63] Continuation-in-part of Ser. No. 679,096, Apr. 21, 1976, abandoned.

[30] Foreign Application Priority Data

May 2, 1975 [ZA] South Africa .................. 75/2842
May 28, 1975 [ZA] South Africa .................. 75/3444

[51] Int. Cl.² ............................................. B01D 15/08
[52] U.S. Cl. ..................................... 210/31 C; 55/67; 55/386; 65/31; 156/646; 156/662; 210/198 C

[58] Field of Search ................. 55/67, 197, 386; 210/31 C, 198 C; 65/31; 156/4, 24, 25, 646, 662

[56] References Cited

U.S. PATENT DOCUMENTS

| | | | |
|---|---|---|---|
| 2,215,039 | 9/1940 | Hood et al. | 65/31 |
| 2,490,662 | 12/1949 | Thomsen | 65/31 X |
| 2,835,637 | 5/1958 | Dowden et al. | 65/31 X |
| 3,249,246 | 5/1966 | Mahoney | 156/25 X |
| 3,722,181 | 3/1973 | Kirkland et al. | 210/198 C |
| 3,734,802 | 5/1973 | Cohen | 65/31 X |
| 3,796,657 | 3/1974 | Pretorius et al. | 210/198 C |

*Primary Examiner*—John Adee
*Attorney, Agent, or Firm*—Millen & White

[57] ABSTRACT

A body having a siliceous surface provided with a surface texture comprising predominantly a plurality of siliceous microvilli or whiskers projecting from and grown onto the surface is useful as a solid stationary phase for chromatography.

36 Claims, 12 Drawing Figures

SOLID SURFACE TEXTURE SUITABLE FOR A STATIONARY PHASE FOR CHROMATOGRAPHY

CROSS REFERENCE TO RELATED APPLICATIONS

This application is a continuation-in-part of U.S. Ser. No. 679,096, filed on Apr. 21, 1976, now abandoned.

BACKGROUND OF THE INVENTION

The development of open tubular columns, particularly those having very narrow bores of capillary dimensions, has been very significant, particularly in gas chromatography.

A major shortcoming of wall-coated open tubular columns (WCOT) used for gas chromatography is their relatively high phase ratio, i.e., the ratio of the volume of mobile phase per unit column length to the volume of stationary phase per unit column length. This ratio is generally denoted by the symbol $\beta$, and usually has a numerical value between 150 and 500. This value of $\beta$ leads to low values of partition ratio, which in turn decreases the number of effective theoretical plates. Increasing the thickness of the layer of stationary phase on the column wall in attempting to improve the values of $\beta$ increases resistance to mass transfer with a resultant decrease in the number of effective theoretical plates per unit column length.

Closely related to the problem of high phase ratio is the limited sample capacity of open tube columns due to the small amount of stationary retarding phase per unit length of column. As a result, the available efficiency of such columns cannot always be fully utilised for analytical purposes owing to limited sensitivity of conventional detectors.

Attempts to improve the phase ratio of capillary columns have included roughening the inner walls of the column by etching and by depositing sodium chloride thereon. These methods can produce only a limited increase in surface area of the column walls and, therefore, only a limited improvement in $\beta$-values.

Acceptable $\beta$-values have been obtained by making support-coated open tubular columns (SCOT) in which a layer of support particles, e.g. diatomaceous earth, is deposited on the inner walls of the tube. However, it is very difficult to produce SCOT columns with uniform and completely reproducible characteristics. SCOT columns also have a comparatively short useful life. A feature of capillary open tubular columns is that their separating efficiency in terms of $\beta$-values and plate height improves as the diameter decreases. However, SCOT columns with diameters below about 0.5 mm cannot be made by conventional methods.

Accordingly, there is a continuing demand for improved open-tubular chromatography columns.

SUMMARY OF THE INVENTION

This invention relates in a structural aspect to a body having a siliceous surface provided with a surface texture comprising predominantly a plurality of siliceous microvilli projecting from and grown onto the surface.

In another aspect, this invention relates, in an apparatus for chromatography equipped with a solid stationary phase comprising a capillary column or a packed column, to the improvement comprising using as the capillary column or as packing for the packed column, a body having a surface configuration of a plurality of microvilli projecting from the surface of a substrate.

This invention further relates to a stationary phase for chromatography having a surface configuration comprising a plurality of microvilli projecting from the surface of a substrate.

In a method-of-use aspect, this invention relates, in a process for chromatographic separation which comprises subjecting a mixture to chromatographic separation between a stationary phase and a moving gas or liquid to effect separation of components of the mixture, the improvement comprising using as the stationary phase a surface provided with microvilli, as above.

This invention further relates to a process for making bodies with siliceous microvilli by subjecting a surface to the action of the vapor of a silica-dissolving medium at a concentration higher than that required for achieving an etching effect and below that at which coarse crystal growth predominates.

BRIEF DESCRIPTION OF THE DRAWINGS

The accompanying drawings serve to illustrate various aspects of the present invention.

DETAILED DESCRIPTION

Figure 1:
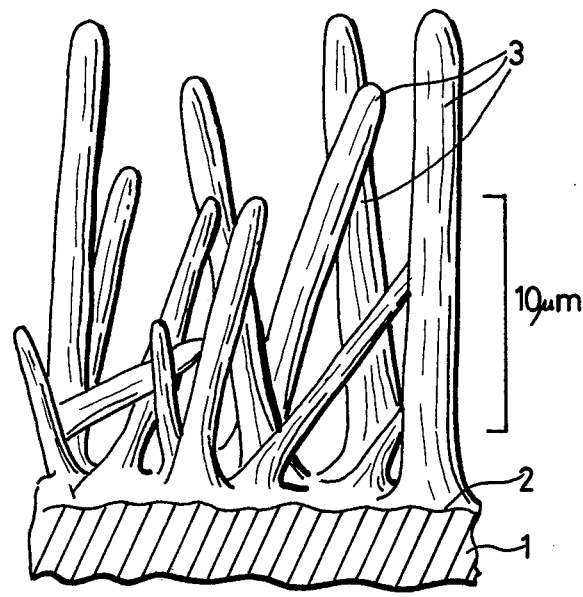
FIG. 1 represents an end-on view of the surface of the body in accordance with the invention by way of a typical example, drawn to scale, as observed under an electron scanning microscope.

"Microvilli" is derived from "villi", a term described in the Shorter Oxford English Dictionary as long, slender hairs or slender hair-like processes or minute projections, closely set upon a surface. The word is derived from Latin "villus", meaning "tuft of hair, shaggy hair".

"Microvilli" means formations which can be observed under a scanning electron microscope and which look like slender hair-like projections grown from and forming part of the surface to which they are attached. They are between $10^{-4}$ and $10^{-2}$ cm in length, more particularly between $10^{-4}$ and $5 \times 10^{-3}$, most preferably $5 \times 10^{-4}$ to $4 \times 10^{-3}$ cm. The ratio of length to diameter may be between 3:1 and 100:1, with a large fraction between 6:1 and 50:1, and most having a diameter between 8:1 and 25:1.

The invention permits the density, i.e., the number of microvilli per unit of surface area to be controlled, and the particular density to which preference is given, will to some extend depend on the use to which the invention is to be put in any particular case. Generally the invention relates to synthetic surface textures which comprise a multitude of the said microvilli which, if used in chromatography under laminar flow conditions, would preferably comprise in excess of $10^4$ microvilli per cm$^2$, more preferably in excess of $10^5$ micro whiskers per cm$^2$. Typical and preferred examples comprise between $5 \times 10^6$ and $250 \times 10^6$, more preferably between $7 \times 10^6$ and $50 \times 10^6$ microvilli per cm$^2$, e.g. $25 \times 10^6$/cm$^2$.

However, if the purpose of the microvilli is merely to provide a surface texture which stimulates turbulence in a micro tubular passage, the density may be much less, e.g. corresponding to an average spacing between individual microvilli of between 10 and 60%, preferably between 20 and 30%, e.g., 25% of the diameter of such passage. In a typical capillary chromatographic column this spacing would be about 0.01 cm, i.e., $10^4$ microvilli per cm$^2$. Accordingly, in the same typical column, the widest spacing of 60% of column diameter would correspond to $1.7 \times 10^{+3}$ microvilli per cm$^2$.

In general, the density of microvilli for the invention should be about $1.7 \times 10^3$ to $2.5 \times 10^8$ per cm$^2$, preferably $10^4 - 5 \times 10^7$ per cm$^2$, especially $10^4 - 2.5 \times 10^7$ per cm$^2$.

Generally, the surface of the body is bristled with the microvilli.

In a preferred embodiment of the invention, the microvilli have a dentritically branched micro structure or texture.

The siliceous surface may be silica, silicate, or glass. Preferably, the surface is glass.

Silica includes all forms of natural and synthetic crystalline, amorphous or crypto crystalline anhydrous or hydrated solid forms of silica, in particular quartz (including its $\alpha$ and $\beta$ forms), cristobalite, tridymite, chalcedony, agate, flint, opal, but in particular fused quartz.

Silicates usable in the practice of this invention are generally speaking, all solid, natural or synthetic silicates in crystalline, crypto crystalline or amorphous form as well as glasses. Examples of crystalline silicates which can be used are feldspars, members of the pyroxene, amphibole, garnet and mica groups, to mention but a few.

For most purposes of practical use to which the invention is directed, glasses are at present preferred, because of the ease with which various types of glass can be presented in desired shapes and configurations such as in the form of tubes, e.g. capillaries, beads, enamel coatings, foams or sheets (sheets of glass treated in accordance with the invention being for example, proposed for use in thin layer chromatography).

All silica-based glasses can be used for the purposes of the invention. Preferred are commercially available types of glasses (including enamels) and in particular those glasses which are commonly used in the manufacture of laboratory glassware, namely in particular soda glasses and borosilicate glasses (see for example the catalogue of Jobling Laboratory Division, 1972).

In the following the invention will be described with particular emphasis on the provision of microvilli on the inner surfaces of capillaries. These procedures can be applied in principle to any size of tube or capillary, even though for purposes of capillary chromatography (one of the preferred applications of the invention) one would normally employ capillaries having an inner diameter of 30 microns to 1 mm, preferably between 50 and 500 microns. In the case of such capillaries being intended for liquid chromatography, the lower limit of the inner diameter would normally be about 100 microns.

Planar surfaces or beads or particles or bodies of optional shapes can obviously be treated in an analogous manner in an appropriate closed reaction vessel.

The body itself may be made of glass or may be coated with glass or other siliceous surface. A preferred glass is borosilicate glass, e.g. glass known by the trade mark PYREX.

Microvilli are composed on the bodies of this invention wholly or predominantly of silica, as indicated by x-ray emission spectra and the manner of their formation. Characteristics of the microvilli make siliceous surfaces provided therewith suitable for use as a solid stationary phase for chromatography, if necessary, after partial deactivation as known in the art of chromatography. Siliceous surfaces provided with microvilli are particularly appropriate as a support for an applied stationary phase, e.g. solid stationary phases including graphite and ion exchange materials; thin films of liquids, e.g. applied thin films of liquid stationary phase; or a stationary phase chemically bonded to the surface. When a stationary phase is applied to the external surface of the microvilli, the microvilli are preferably enveloped or coated individually so that the surface configuration of the microvilli is retained rather than being completely embedded in a layer of stationary phase.

Examples of liquid stationary phases include all liquid stationary phases known in chromatography in the context of glass substrates, and which may vary from nonpolar in properties to comparatively highly polar. Specific examples are squalane, polyethylene glycol, liquid paraffin, silicone oils, diethylene glycol succinate and various proprietary brands of liquid stationary phases.

As regards chemically bonded stationary phases, all such phases may be used which are conventionally bonded to glass or silica substrates in chromatography for that purpose. Reference may be had to the abundant literature on this subject, such as "bonded stationary phases in chromatography" by Eli Grusha, Ann Arbor Science Publishers Inc., Michigan, 1974; or "Bonded Stationary Phases for Chromatography", D.C. Locke et alia, J. Chem. Soc. (1953), pages 209 to 211. Particularly well-known are bonded stationary phases formed by the reaction of various substituted silanes, e.g. halogeno di- and tri-organo silanes which react with the substrate to form a film bonded to the substrate through —OSi—O bonds (see U.S. Pat. No. 3,514,925 in the name of C. J. Bossart).

The novel material may be employed for any purpose for which a surface texture as described is advantageous.

However, a preferred application is that in which the body of this invention is in form of a tube, the inner surface of which is the siliceous surface provided with the surface texture of microvilli. Such a tube may be used as a chromatographic column and can be of any capillary dimension available for this purpose.

The bodies of this invention may also be employed in other forms of chromatographic separation media, including the surface of siliceous powders, particularly glass bead or silica powders, which may be used as particulate support materials or particulate solid stationary phase materials in gas or liquid chromatography, e.g. as a packing material for columns or as a coating material for SCOT columns or as a thin layer medium.

Reference is made to South African Pat. No. 65/6633 in the name of Victor Pretorius and Hans Helmut Hahn and corresponding patents in other countries, including U.S. Pat. No. 3,796,657; British Pat. No. 1,169,523, and German Pat. No. 1,517,944, which describe and claim separating columns, particularly chromatographic columns, filled with an open pore reticulated foam as stationary phase or support for the stationary phase. When such a foam is composed of or coated with a suitable siliceous material, e.g. glass, the surface can be improved for chromatographic purposes by providing said surface with texture, including a plurality of multitude of siliceous microvilli.

In South African Pat. No. 66/4773 in the name of Victor Pretorius and Hans Helmut Hahn and corresponding patents in other countries, e.g. U.S. Pat. No. 3,522,172; British Pat. No. 1,183,833 and German accepted Specification No. 1,673,011, is described the use in chromatography, particularly high speed chromatography, of surfaces having a "furred or whiskered surface texture" as support for a liquid stationary phase. As described therein, the micro-whiskers of said surface are completely embedded in a layer of the stationary phase, so as to make possible the application of a heavier film of liquid stationary phase to the surface. Surfaces provided with siliceous microvilli of the present invention can be used in the same way.

In accordance with the present invention, it is particularly advantageous in appropriate circumstances to substantially preserve and outline the novel surface with a thin coating of stationary phase. A further aspect of this invention is a chromatographic stationary phase which, in contrast to teachings of aforesaid South African Pat. No. 66/4773, has the surface configuration of a plurality or multitude of microvilli projecting from the substrate, regardless of the material of which the microvilli are composed. For example, the microvilli may be cuprous oxide micro-whiskers grown on a copper substrate and described in the above patent. These or other suitable microvilli serve as a solid stationary phase for chromatography or may be coated at the surface with a continuous or intermittent layer of stationary phase, provided that surface configuration of the microvilli is substantially preserved within the exposed surface of the applied stationary phase.

Siliceous microvilli are preferred for chromatographic purposes. They are mechanically strong and do not easily break off. They also have very desirable chemical characteristics for chromatography, in active or in deactivated form.

In accordance with the present invention there is also provided a chromatographic separation process wherein a stationary phase having a surface of microvilli as described above, a stationary phase supported on siliceous microvilli in any manner whatsoever or a stationary phase supported on microvilli of any other composition individually coated with another stationary phase in such a manner that the microvilli structure is substantially retained in the texture of the exposed surface, is used.

Other compositions which may be used include cuprous oxide and silver.

The microvilli of the above stationary phases also provide a surface roughness which tends to induce vortices and eventually turbulence in the mobile phase at flow velocities lower than those at which such flow characteristics can be attained if the surface of the stationary phase were completely smooth. Creation of such vortices and turbulent conditions, are desirable because of lowering the height of a theoretical plate. See South African Pat. Nos. 65/2502 and 66/4773; German Pat. Nos. 1,598,555 and 1,673,011; British Pat. Nos. 1,148,661 and 1,183,833 and U.S. Pat. Nos. 3,493,497 and 3,522,172.

Also, provided in accordance with the invention is a process for making a body of the invention which comprises subjecting a siliceous surface to the action of the vapor of a silica-dissolving medium at a concentration higher than required for an etching effect and lower than that at which coarse crystal growth predominates.

A mere "etching effect" in the present context means the mere erosion of the surface. Such erosion can result in a virtually uniform wearing or dissolving away of the treated surface or, particularly in the case of glass surfaces, a scanning electron micrograph reveals an uneven surface erosion resulting in a submicroscopic roughening of the surface (but without the redeposition of the dissolved silica in the form of microvilli as herein described).

As the concentration of the silica-dissolving medium is increased, one can observe under the scanning electron microscope the redeposition of the silica in the form of the said microvilli. Increasing the concentration further, results in an increase in density (number of microvilli per unit area) and in the dimensions of the microvilli. At even higher concentrations, a stage of coarse crystal or villi growth is reached in a sense of a substantially uncontrolled, jungle-like intergrowth, excessive unevenness of dimensions, some villi being many times larger and coarser than others, usually with a preponderance of villi reaching or exceeding a length of $10^{-2}$ cm and a frequent occurrence of sharp bends in the longitudinal direction of the microvilli. The coarse texture can also be described as felt-like.

The silica-dissolving substance is preferably a fluorine-containing substance, for example, hydrofluoric acid or methyltrifluorochloroethyl ether or any chemically-related substance known to liberate hydrofluoric acid on heating. Examples include, but are not limited to 2-chloro-1,1,2-trifluoroethylmethyl ether, 2-chloro-1,1,2-trifluoroethylethyl ether, 2-chloro-1,1,2-trifluoroethylallyl ether, fluorotrichloro-methane, 1-fluoro-1,1,2,2-tetrachloro-ethane and para-fluoro-phenetole.

Methyltrifluorochloroethyl ether (MTFEE) is a preferred reagent. If the partial pressure of this reagent is too low, an etching effect accompanied by slight surface roughening, but not by the growth of the aforesaid microvilli, results. If the partial pressure is too high, coarse, felted, irregular and uncontrolled textures are formed instead of controlled, substantially regular microvilli textures.

The concentration of MTFEE should be at least 20 ml of reagent in liquid form per liter of vapor space in which the siliceous surface being treated is contained but not more than about 300 ml per liter of such space. Preferred limits are 20 and 150 ml per liter of space, most preferably between 25 and 120 ml, especially 25 and 100 ml per liter of space.

Because the purity of the reagent affects the growth of microvilli, the reagent should be very pure. For MTFEE, the preferred purity level is that of the pure, fresh commercial product which we found to be gas chromatographically pure. We also observed that if this product is exposed to light and/or air, there is a definite deterioration in terms of the desired effects, even though there may be no visible change.

If a reagent other than MTFEE is used, its concentration should be equivalent to that defined above for MTFEE in terms of amounts of hydrofluoric acid made available by such reagent.

Treatment is generally conducted at a minimum temperature of 240°, preferably 300°, whereas the maximum temperature is generally about 500°, preferably 400°–450° C., e.g. 420° C. Thus, suitable temperature ranges for the treatment include but are not limited to 240°–500° C., 250°–450° C., and 320°–400° C. A temperature of about 400° C. is especially suitable. Optimum growth of microvilli is attained between 350° and 420° C., more particularly 400° C., using between 25 and 75 ml of liquid reagent per liter of vapor space. The temperature should be kept constant over the length of a tubular column or substrate being treated as should vapor concentration.

In a preferred procedure, the required volume of fluorine-containing reagent is introduced into a capillary to be treated, e.g. a capillary in the form of a coil, and is distributed along the length of the coil so that each turn of the coil contains an approximately equal volume of reagent. The ends of the capillary are sealed and the tube is heated to the required temperature.

The period of heating applied and the temperature used determine the length to which the microvilli grow. A minimum of about 1 hour is required, but the preferred range is 1 to 6 hours. Heating has been continued for up to 24 hours, but after about 6 hours little additional growth is observed. The preferred range is between 2 and 5 hours, e.g. 3.4 hours. The treatment is done in a non-oxidizing atmosphere, e.g. $N_2$.

From the aforegoing it follows that there are mainly three parameters, i.e. reagent concentration, temperature and time by means of which, of a given type of surface, the process can be regulated to control not only the size, but also the density (number of microvilli per unit of surface area) of the microvilli. Within the general limits stated, a comparatively low temperature and high concentration of reagent will yield a high density of comparatively thick, but (at least initially) short microvilli.

A high temperature, but low reagent concentration will yield a high density of thin and (at least initially) short microvilli.

Near the lower limits of concentration and temperature, there is obtained a low density of small, at least initially short whiskers.

In all of the foregoing cases the length of the microvilli may be increased by lengthening the time of exposure but, as stated above, after about 6 hours the further growth usually becomes slow and no noticeable further growth was observed after 24 hours.

After heat treatment, the ends of the tube are opened and the interior of the tube is purged with dry nitrogen gas, e.g. at room temperature, or preferably heated, e.g. to 100°–300° C., most preferably 200° C. If this treatment is omitted, an imperfect microvilli texture, interspersed with crystalline growths, may result. The treatment cycle may be repeated, if desired. Microvilli having a dendritic micro texture have been obtained this way. These have also sometimes formed spontaneously.

The surface of the microvilli thus produced is highly active and the treated body can be used for gas chromatography or, if desired, liquid chromatography.

The treated surface has a brownish to blackish appearance, which is thought to be a light deposit of finely dispersed carbon. It is theorized that these deposits occur when the silica-dissolving medium is a carbonaceous substance which decomposes during the process. This carbon may improve the properties of the surface, but can readily be removed by treatment with a slowly flowing stream of oxygen gas at 400° to 450° C. for 6 to 12 hours.

For some applications, it is desirable to deactivate the treated surface, e.g. by heating at high temperatures, e.g. at 450° to 500° C. in a known manner, by hydration in a known manner, followed by silanation or graphitization such as by treatment with acetylene at high temperatures.

Although material prepared in accordance with the invention is considered particularly adapted for gas chromatography, use of the material for liquid chromatography is within the scope of the invention. In this connection the improved mechanical stability of the micro texture is a particular advantage. Conventional SCOT-columns are insufficiently stable for liquid chromatography, their surface texture being damaged if liquid is caused to flow through such a column.

This invention further includes use of the novel siliceous surfaces herein described for purposes other than chromatography, including but not limited to the promotion of intimate contact with a flowing liquid, vapour or gas phase, e.g. supports for catalysts. Another example is the creation of surface textures which promote the bonding of glass, silica or silicate surfaces to another body or substance, e.g. with the use of a separate adhesive or, where the other substance itself has bonding properties, e.g. in the context of applying coatings such as paints, varnishes or thermo-plastics or thermo-setting resin coats or in the manufacture of laminates. Where it is desired to produce composite bodies of silica or silicate particles, e.g. from abrasive silicate minerals such as garnet, it is possible to pretreat the surfaces of the particles in the manner according to the invention in order to provide microvilli which improve the adhesion of the particles to the bonding substance or matrix.

FIG. 1 shows in end elevation a typical surface texture of a body in accordance with the invention, wherein 1 represents the siliceous material, e.g. glass or quartz or silicate constituting the siliceous surface 2 from which grow the microvilli free of silica. These have lengths varying between 5 and 20 micron and thicknesses of between 0,5 and 2½ micron. The surface 2 between the individual microvilli is rough as a result of etching effects which take place simultaneously with the growth of the whiskers.

Figure 2:
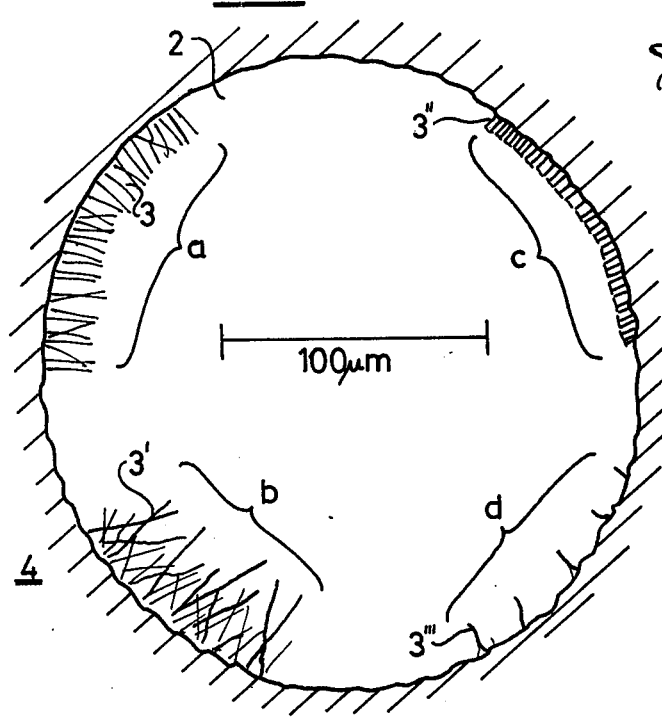
FIG. 2 represents an end-on view of a glass capillary as observed under the electron-scanning microscope, different portions marked a, b, c and d illustrating four examples of forms of microvilli growth produced in accordance with the invention.

FIG. 2 represents on a smaller scale four examples of whisker microvilli textures (in end elevation) grown onto the inner surface 2 of a glass capillary 4. Portion a comprises a multitude of whiskers 3 substantially as shown in FIG. 1.

In portion b the whiskers 3' have been caused to grow to greater average lengths nearer the upper limit of the preferred range of lengths of the whiskers. It can be seen that the texture is already somewhat coarse, being less regular and uniform than that in the case of portion a, but still satisfactory for most purposes.

Portion c represents microvilli 3'' having about ½ the length of those in accordance with portion a, and being of a particularly high degree of uniformity and evenness.

Portion d illustrates an example of whiskers 3''' grown in a configuration of very low density, useful for example for the mere promotion of turbulence inside the capillary.

Figure 3:
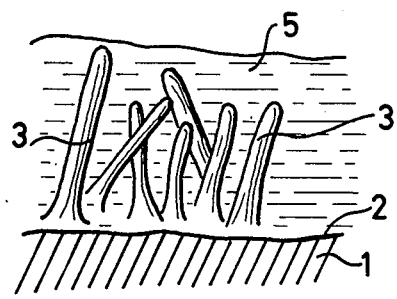
FIG. 3 represents an end-on view slightly diagrammatic, similar to FIG. 1, but on a slightly smaller scale of the surface of a body in accordance with the invention impregnated with a liquid chromatographic stationary phase to such an extent that the microvilli are totally embedded, and that the microvilli texture of the body is obscured.
Figure 4:
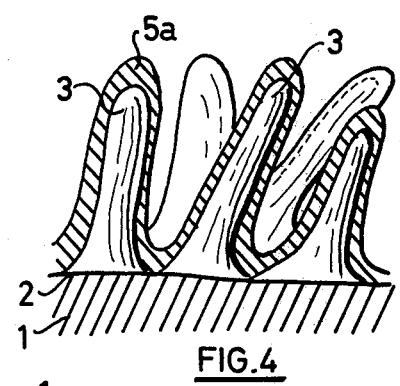
FIG. 4 represents a view similar to FIG. 3, but exemplifying an embodiment wherein the microvilli of the surface texture are individually coated with a layer of stationary phase so thin that the microvilli outlines are substantially preserved in the coated object (part of the coating is shown in section).

In accordance with FIG. 3, the whiskers 3 are completely embedded in a layer 5 of a chromatographic liquid stationary phase. In this case the purpose of the microvilli is to hold in place a comparatively thick layer of liquid stationary phase 5. This is a possible application of the invention, but not a preferred application. A more preferred application is illustrated in FIG. 4, where the stationary phase 5a (which could be a physically applied layer of liquid or a substance chemically bonded to the substrate, or a solid stationary phase) is applied as a layer sufficiently thin to coat the microvilli 3 individually such that the microvilli surface texture is essentially preserved in the surface of the body.

Figure 5:
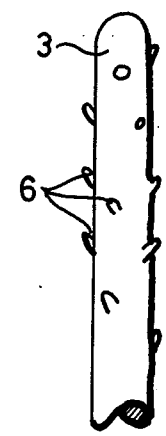
FIG. 5 represents an elevation of a single whisker of the microvilli texture to which the invention relates, illustrative of an embodiment wherein secondary villi growth has just commenced on the surface of the whisker.
Figure 6:
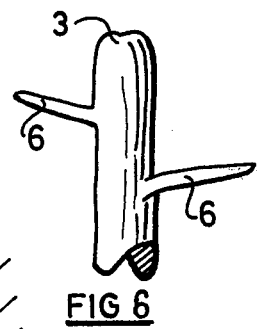
FIG. 6 represents a view similar to FIG. 5, but wherein the secondary villi growth has proceeded to the formation of a fully developed dendritic microvilli texture.

FIG. 5 represents an individual whisker, the surface of which exhibits the first indications of secondary microvilli 6 therefrom, these being more fully developed in the case of FIG. 6, the result being a true dendritic micro texture.

Figure 7:
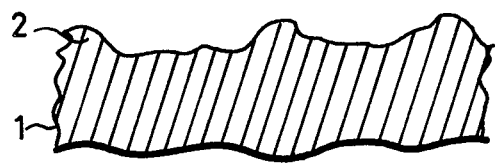
FIG. 7 represents an end-on view of a glass or quartz surface treated with the same chemicals as employed in accordance with the invention, but under conditions which merely resulted in an etching effect.

FIG. 7 illustrates the etched appearance of a glass surface, which results from the use of a reagent concentration too low for the formation of microvilli. When the reagent concentration is increased sufficiently, the microvilli texture grows from and onto the texture illustrated in FIG. 7.

Figure 8:
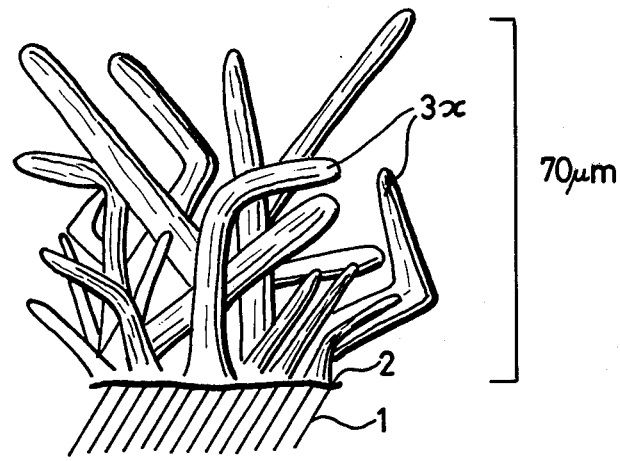
FIG. 8 represents a view similar to FIGS. 1 and 7, illustrating an example wherein the microvilli growth is beginning to show symptoms of coarse crystal growth.

Referring to FIG. 8, as the reagent concentration in the process is increased further, beyond that which gave rise to texture b in FIG. 2, a coarse texture is eventually attained, wherein the whiskers are highly irregular in felted interrelationship where the texture becomes unsatisfactory for chromatography. Not only are the individual whiskers grossly intergrown and of widely varying dimensions, but a substantial proportion, as exemplified by 3X, are of crooked shape.

FIGS. 9, 10, 11 and 12 will be described in the specific examples of chromatographic separations.

Without further elaboration, it is believed that one skilled in the art can, using the preceding description, utilise the present invention to its fullest extent. The following preferred specific embodiments are, therefore, to be construed as merely illustrative, and not limitative of the remainder of the disclosure in any way whatsoever.

EXAMPLE 1

A coiled glass capillary (Pyrex) having an inner radius of 0.0170 cm and 50 meters long is filled to 7.5% of its volume with methyltrifluorochloroethyl ether, which is evenly distributed throughout the length of the column. The ends of the column are sealed and the entire column is heated evenly for 3.5 hours at 350° C. The column is opened at both ends and thoroughly purged with nitrogen. Inspection by scanning electron microscopy indicated that the entire column surface is evenly coated with microvilli approximately $10^{-3}$ cm. long, most of which project at right angles to the surface towards the column interior and which have an average thickness of approximately 1/15 the length of the microvilli. In addition there was evidence of a layer of graphite adhering to the surfaces of the microvilli and their substrate. The graphite apparently was a decomposition product of the reagent.

This graphite can be removed by heating the tube for 6-12 hours at 400°-450° C. under a gentle flow of oxygen.

EXAMPLE 2

A column made as described in Example 1 is treated as follows to apply a thin film of squalane to the surfaces of the microvilli:

A plug equivalent in volume to 10% of the tube volume and consisting of a 5% solution of squalane in toluene is pushed through the tube with nitrogen gas at a linear velocity of 4 cm/sec. The nitrogen flow rate is then increased to 15-20 cm/sec. and maintained for 12 hours. The column is conditioned for at least 24 hours at 120° C. with a nitrogen flow of about 10 cm/sec.

EXAMPLE 3

A column prepared by the procedure of Example 2 is installed in a gas chromatographic apparatus. A small sample of a commercial brand of gasoline (volume 0,03 micro liters) is introduced into the column by a conventional sample inlet and chromatographed under the following conditions:

Carrier gas: $N_2$, 10 cm/sec

Temperature: programmed to increase from 45° C. to 120° C. at 2° C./min.; maintained at 120° C. for the remainder of the experiment. Total elution time 1.5 hours.

The recorded chromatogram had no fewer than 210 peaks and the chromatogram was fully reproducible.

EXAMPLE 4

Boro-silicon glass tubes (pyrex) and soda glass tubes were drawn in a conventional apparatus for drawing capillary tubes (manufactured by Dr. Hupe Apparatebau) to an inner diameter of 0.25 to 0.35 mm and an outer diameter of 0.9-1.1 mm, one of the open ends of each column is connected to a vacuum pump and the other to a short length of wider bore glass tubing (5 mm inner diameter) into which a silicon rubber septum is inserted. The connections are made by means of heat-shrinkable trifluorochloropolyethylene. The system is pumped to $10^{-4}$ mm Hg, after which the end of the column attached to the vacuum is sealed off using a microflame. The required amount of MTFEE is injected through the septum and the end of the column connected to the septum is sealed off as described above. Between 25 and 75 ml of reagent in liquid form per liter of capillary volume are employed. Heating then takes place for 4 hours at 400° C. The column is then removed from the oven, the ends are opened and the column is immediately flushed with dry nitrogen at 200° C. This is followed by heating the tube for 6 to 12 hours at 450° C. whilst the column is gently flushed with oxygen.

The texture obtained with 25 ml reagent per liter of column volume, is as shown in portion c of FIG. 2. Portion a and the texture as illustrated in FIG. 1 result when using 75 ml of reagent per liter. Similar textures are obtained also at slightly higher concentrations up to about 100 ml of reagent per liter of space. The texture represented by portion b of FIG. 2 results from using about 150 ml of MTFEE per liter of vapour space. A texture as illustrated in FIG. 8 results at about 250 ml of reagent per liter of column space at about 420° C. or at about 300 ml of reagent per liter of space and 400° C. (All 4 hours exposure).

A texture as represented by portion d in FIG. 2, would be obtained for example, with 20 ml of reagent per liter of column space at 300° C., maintained for a period of 24 hours.

EXAMPLE 5

Columns prepared in accordance with Example 1 or 4 are treated as follows to deactivate the surface of the microvilli:

Nitrogen is bubbled through a mixture of hexamethyldisilazane and trimethylchloroxylene (5/1) at 25° C. and the resulting vapour mixture is passed continuously through the column at 200° C. for 24 hours, followed by flushing with dry nitrogen at 200° C. for 6 to 12 hours.

A column thus treated having the following dimensions: 55.4 mm ×0.032 cm inner diameter was impregnated with squalane as stationary phase in the manner described in Example 2.

Figure 9:
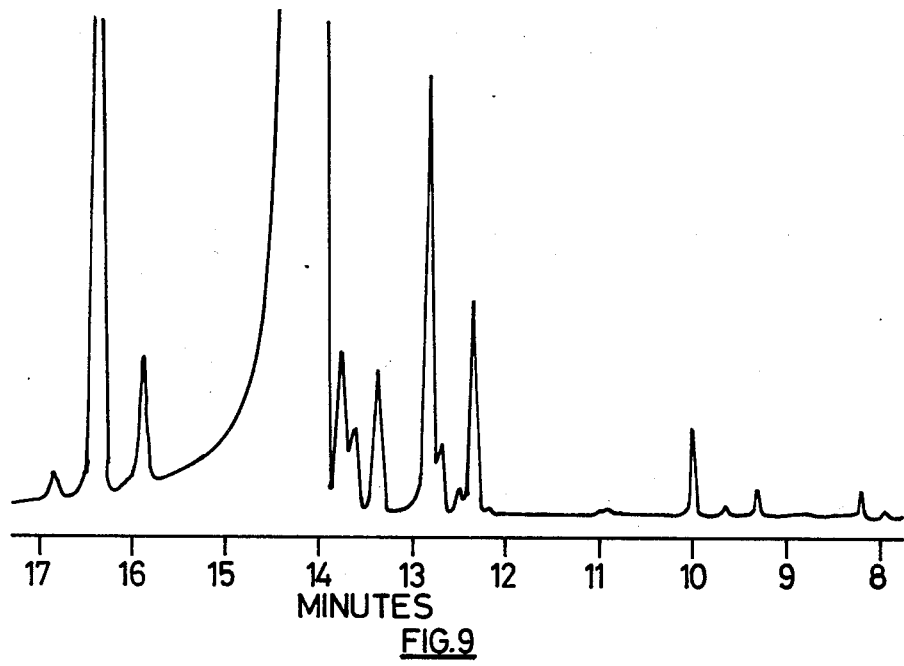

Analytically pure n-heptane (sample volume 2µl ) was subjected to gas chromatography on that column with nitrogen as carrier gas (flow velocity 14 cm/second, column temperature 85° C.). The resulting chromatogram is shown in FIG. 9, wherein the small peak marked with an arrow corresponds to a quantity lower than 1 ppm.

EXAMPLE 6

A column prepared as in Example 5, 54 m long, 0.024 cm inner diameter, was impregnated with a commercial brand of stationary phase (OV-101). A synthetic mixture of chlorinated pesticides was analysed under the following conditions:

Carrier gas nitrogen (15 cm/second)

sample volume 1 µl; column temperature 220° C.

Figure 10:
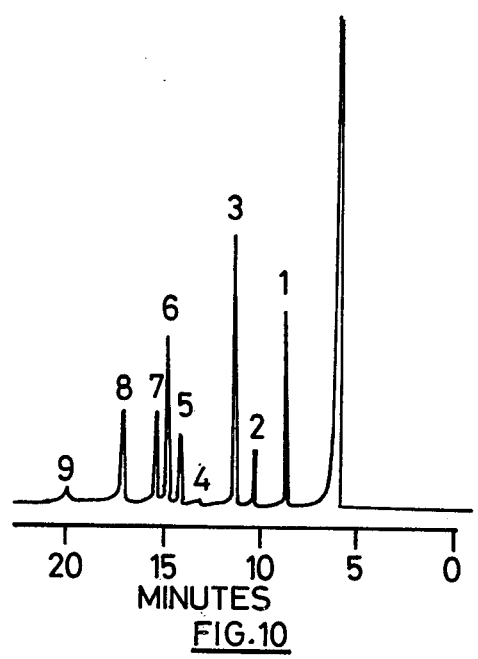
FIGS. 9 to 12 represent examples of chromatograms obtained with chromatographic columns in accordance with the invention.

The chromatogram is illustrated in FIG. 10, in which the following peaks were identified:

1 δ-BHC
2 Heptachlor
3 Aldrin
4 α-Thiodane
5 p,p$^1$-DDE
6 β-Thiodane
7 p,p$^1$-TDE
8 p,p$^1$-DDT
9 Dieldrin

EXAMPLE 7

Figure 11:
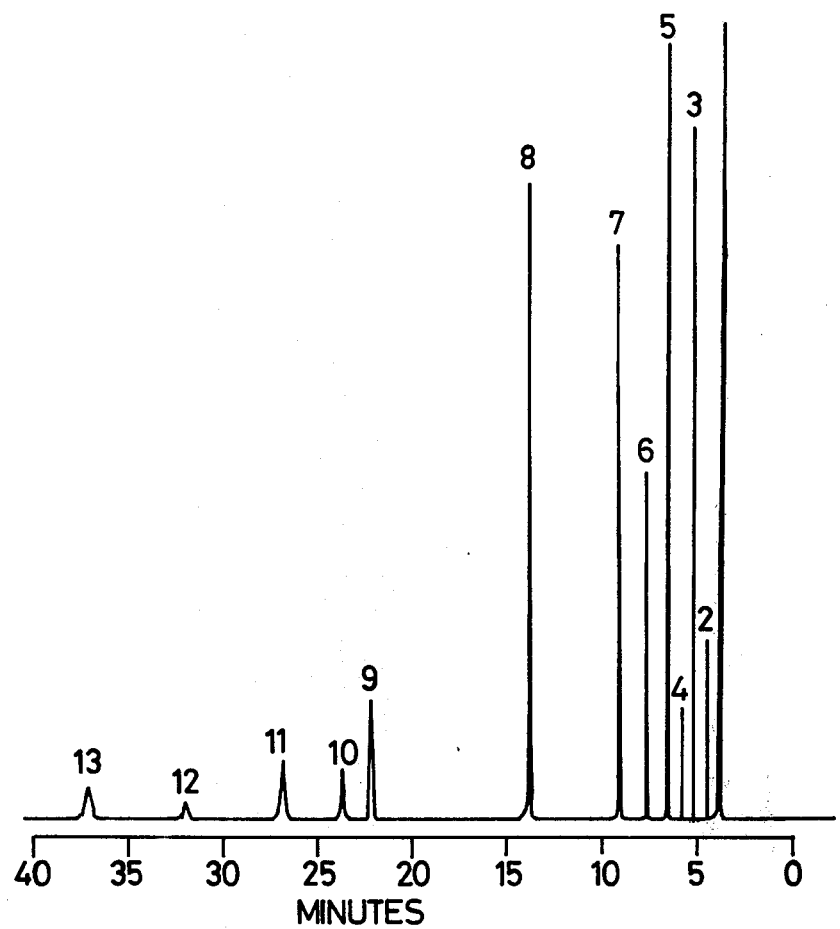

A column prepared as in Example 5 was used 48.5 m long, 0.024 cm inner diameter, impregnated with polyethyleneglycol as stationary phase. A synthetic mixture of $C_6$–$C_{20}$ fatty acid methyl esters was analysed with nitrogen as carrier gas (24 cm/second) and a column temperature of 220° C. The sample injected was 1 µl . FIG. 11 illustrates the chromatogram obtained, in which the following peaks can be identified:

1 methyl caproate (n-$C_6$)
2 methyl caprylate (n-$C_8$)
3 methyl caprate (n-$C_{10}$)
4 methyl undecanoate (n-$C_{11}$)
5 methyl laurate (n-$C_{12}$)
6 methyl tridecanoate (n-$C_{13}$)
7 methyl myristate (n-$C_{14}$)
8 methyl palmitate (n-$C_{16}$)
9 methyl stearate (n-$C_{18}$)
10 methyl oleate (n-$C_{18}^{1=}$)
11 methyl linoleate (n-$C_{18}^{2=}$)
12 methyl linolelaidate (n-$C_{18}^{3=}$)
13 methyl arachidate (n-$C_{20}$)

EXAMPLE 8

A column prepared as in Example 5 having the same dimensions as in the previous example, but impregnated with a commercial brand of stationary phase (Dexsil 410) is used to analyse a synthetic mixture of trimethylsilyl (TMS) derivatives of 17 ketosteroids. Sample volume 2 µl , column temperature 220° C. Carrier gas:nitrogen at 20 cm/second.

Figure 12:
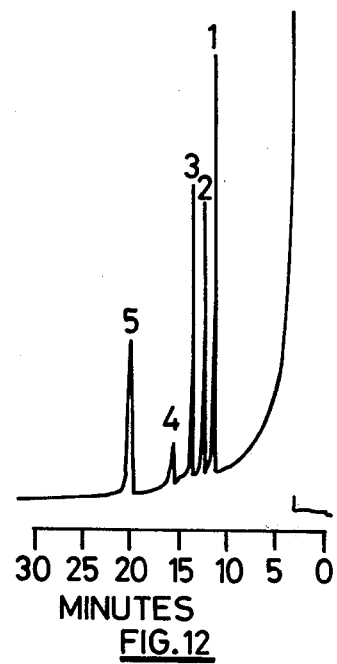

The chromatogram is shown in FIG. 12 in which the peaks represent the following:

TMS derivatives of:

1 etiocholanolane
2 androsterone
3 dehydro-epi-androsterone
4 11-keto-androsterone
5 11-β-hydroxy-etiocholanolane

EXAMPLE 9

The same column as in Example 7 was used for the analysis of fatty acid methyl esters of a polished mackerel oil at a nitrogen flow rate of 16 cm/second and a column temperature of 230° C. The sample volume was 1 µl. 57 peaks were clearly recognisable with indications of at least ½ dozen further peaks indicating traces of additional components.

EXAMPLE 10

The same column was used to analyse a sample of peppermint oil at a nitrogen flow rate of 24 cm/second. The sample volume was 1 µl and the column temperature was programmed to rise from 100° C. by 4° C. per minute over a total period of 25 minutes. 51 peaks were observed.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What we claim is:

1. A body having a siliceous surface provided with a surface texture comprising siliceous microvilli projecting from and grown onto the surface, the density of microvilli being not less than $1.7 \times 10^3$ microvilli per $cm^2$.

2. The body of claim 1, wherein the microvilli are between $10^{-4}$ and $10^{-2}$ cm in length.

3. The body of claim 2, wherein the ratio of length to diameter of said microvilli is between 3:1 and 100:1.

4. The body of claim 1, wherein the microvilli are between $10^{-4}$ and $5 \times 10^{-3}$ cm in length.

5. The body of claim 4, wherein the ratio of length to diameter of said microvilli is between 6:1 and 50:1.

6. The body of claim 5, wherein the ratio of length to diameter of said microvilli is between 8:1 and 25:1.

7. The body of claim 1, wherein the microvilli have a dendritically-branched micro structure.

8. The body of claim 1, wherein the siliceous surface is silica, silicate or glass.

9. The body of claim 8, wherein said microvilli are composed wholly or predominantly of silica.

10. A process for making a body of claim 1 which comprises subjecting a siliceous surface to the action of the vapor of a silica-dissolving medium at a concentration higher than that required for achieving an etching effect and below that at which a coarse crystal growth predominates and recovering a body as defined in claim 1, wherein the silica-dissolving substance is a fluorine-containing substance and wherein a temperature between 240° and 500° C. is maintained for at least 1 hour in a non-oxidizing atmosphere.

11. The process of claim 10, wherein the fluorine-containing substance is hydrofluoric acid or a fluorocarbon ether which liberates hydrofluoric acid on heating.

12. The process of claim 10, wherein the fluorine-containing substance is methyltrifluorochloroethyl ether (MTFEE).

13. The process of claim 12, wherein methyltrifluorochloroethyl ether is employed at a concentration of 20 to 150 ml of liquid per liter of vapor space in which the siliceous surface being treated is contained and the temperature is between 240° and 500° C.

14. The process of claim 13, wherein the concentration is between 25 and 120 ml per liter and said temperature between 250° and 450° C.

15. The process of claim 14, wherein said concentration is between 25 and 100 ml per liter of vapor space and said temperature is between 350° and 420° C.

16. The process of claim 10, wherein the temperature is maintained for 1 to 6 hours.

17. The process of claim 16, wherein said temperature is maintained for 2 to 5 hours.

18. The process of claim 10, wherein the surface of the microvilli is flushed thoroughly with a dry, inert gas immediately after the completion of formation thereof.

19. The process of claim 18, wherein flushing is carried out at 100° to 300° C.

20. The process of claim 19, wherein said process is repeated after flushing to produce on said microvilli a dendritically-branched micro texture.

21. The process of claim 10, wherein the silica-dissolving medium is a carbonaceous substance which during said process decomposes resulting in light deposits of finely dispersed carbon on the surface and wherein such deposits are removed by exposure of the surface to hot oxygen for several hours.

22. The process of claim 21, wherein the treated surface is exposed to a stream of oxygen at 400° to 450° C. for 6 to 12 hours.

23. The body of claim 1, wherein the density of microvilli is $1.7 \times 10^3$ to $2.5 \times 10^8$ per $cm^2$.

24. A body having a siliceous surface provided with a surface texture comprising siliceous microvilli projecting from and grown onto the surface, said body being in the form of a tube, the inner surface of which is the siliceous surface provided with the surface texture comprising microvilli.

25. The body of claim 24, in the form of chromatographic column.

26. The body of claim 24 which comprises not less than $1.7 \times 10^{+3}$ microvilli per $cm^2$.

27. In an apparatus for chromatography comprising a column containing a solid surface bearing stationary phase exchange sites exposed to a moving phase, said surfaces having a surface configuration of a plurality of microvilli projecting into a flow path of the moving phase.

28. The apparatus of claim 27, wherein the substrate and the microvilli are siliceous.

29. The apparatus of claim 28, wherein the microvilli are partially deactivated prior to use.

30. The apparatus of claim 28, wherein the microvilli are a support for an applied stationary phase.

31. The apparatus of claim 29, wherein the stationary phase is a physically applied thin film of liquid stationary phase or a stationary phase chemically bonded to the surface of said microvilli.

32. The apparatus of claim 30, wherein said microvilli are enveloped or coated individually with retention of said microvilli surface configuration.

33. The apparatus of claim 27, wherein the surface is the inner periphery of a capillary column.

34. The apparatus of claim 27, wherein the surface is the surface of a column packing.

35. In a process for chromatographic separation which comprises subjecting a phase to chromatographic separation between a stationary phase and a moving gas or liquid mixture to effect separation of components, the improvement which comprises using as the stationary phase a surface provided with a plurality of microvilli projecting into the moving phase from and grown onto the surface.

36. The process of claim 35, wherein the surface and the microvilli are siliceous.

* * * * *